United States Patent [19]
Burns et al.

[11] 3,928,578
[45] Dec. 23, 1975

[54] COMPOSITION FOR CONTROL OF WHITE MUSCLE DISEASE

[75] Inventors: Henry C. Burns; George C. McConnell, both of Piedmont, Calif.

[73] Assignee: Chromalloy Pharmaceutical, Inc., Wilmington, Del.

[22] Filed: Dec. 5, 1973

[21] Appl. No.: 421,841

Related U.S. Application Data

[63] Continuation of Ser. No. 639,923, April 28, 1967, Pat. No. 3,829,566, which is a continuation-in-part of Ser. No. 352,681, March 17, 1964, abandoned, which is a continuation-in-part of Ser. Nos. 300,684, Aug. 7, 1963, abandoned, and Ser. No. 96,733, March 20, 1961, abandoned.

[52] U.S. Cl. ................ 424/164; 424/162; 424/284
[51] Int. Cl.² ................ A61K 31/335; A61K 33/04
[58] Field of Search................... 424/162, 164, 284

[56] References Cited
OTHER PUBLICATIONS

Nesheim et al., *J. Nutrition*, Vol. 65, pp. 601–618 (1958).
*Veterinary Drug Encyclopedia*, 6th Ed., (1958), p. 17.
Sharman, *The Veterinary Record*, Aug. 15, 1959, p. 536.
Zalkin et al., *Arch. Biochemistry and Biophysics*, Vol. 91 (1960), pp. 117–122.

*Primary Examiner*—Stanley J. Friedman
*Attorney, Agent, or Firm*—Curtis, Morris & Safford

[57] ABSTRACT

White muscle disease is controlled by administering the combination of a selenium compound and vitamin E, by parenteral injection to any mammal or by oral ingestion in mammals other than herbivores.

9 Claims, No Drawings

COMPOSITION FOR CONTROL OF WHITE MUSCLE DISEASE

This is a continuation application of pending application Ser. No. 639,923 filed Apr. 28, 1967, now U.S. Pat. No. 3,829,566 granted Aug. 13, 1974, which was a continuation-in-part of then copending application Ser. No. 352,681 filed Mar. 17, 1964, now abandoned, which was a continuation-in-part of then copending applications Ser. No. 300,684 filed Aug. 7, 1963 and Ser. No. 96,733 filed Mar. 20, 1961, both now abandoned.

This is a continuation-in-part of our application Ser. No. 352,681, filed Mar. 17, 1964, which was a continuation-in-part of our applications Ser. No. 300,684, filed Aug. 7, 1963, and Ser. No. 96,733, filed Mar. 20, 1961.

The invention relates to a pharmaceutical composition and a process for controlling, i.e. preventing and treating, white muscle disease (herein called WMD) in mammals, including beasts and humans.

WMD in mammals is a clinical manifestation of a disease complex or syndrome characterized by degenerative lesions in the musculature, notably hyalinization and calcium deposits in cardiac and skeletal muscles, including those of the diaphragm, intercostal and limb muscles, genito-urinary, digestive, neurological and skin connective tissue, etc. Early signs are generally weakness and incoordination, although the affected mammals may die at birth. Weakness may progress until an animal cannot rise. Breathing may be labored (dyspnea) and cardiac insufficiency may result in death from asphyxia accompanied by edema and congestion of the lungs. When the heart muscle is affected (myocarditis) the mammal, upon exertion, may drop dead (cardiac arrest). Diarrhea or scours (enteritis) and unthriftiness (ill-thrift) are often observed. A high incidence of reproduction disturbances (barrenness; poor conception rate; abortions; still born offspring; premature births) may occur. Tongue paralysis (glossoplegia) and consequent inability to nurse has often been reported as a clinical sign of this syndrome.

This syndrome may be mild to quite striking in its early appearances. Losses of animals by death range from a few to a high percentage, up to 100%, of the young animals. The economic consequences are severe and their magnitude is apparent from reports regarding Klamath County, Oregon, by the County Extension Agents, a cooperative including Oregon State College and the United States Department of Agriculture. These reports show the annual production in the county of 40,000 calves and 50,000 lambs annually, and losses from WMD by death and other causes was conservatively estimated to be $250,000.00 per year. The Farm Advisor, Cooperative Extension Work, University of California and the United States Department of Agriculture, Siskiyou and Modoc Counties, California, cooperating, reported a conservative estimate of about 1,000 lambs lost yearly from WMD and that during the last year prior to the use of the product of this invention, some sheep men were reporting 40% loss on new lambs due to this disease. The County Extension Agent, Cooperative Extension work, Oregon State College, the United States Department of Agriculture, and Union County, Oregon, cooperating, reported an estimate of between 20,000 and 30,000 calves and lambs lost during the year 1960 due to WMD.

It is believed that WMD is caused by an impairment of activity of selenium or vitamin E in the body, due to a failure of the body to transport or utilize these factors even though they may be present in the diet. While occasional and unpredictable beneficial results had been achieved by the administration of each of these factors separately, the results were so inconsistent and unsatisfactory that no dependable treatment was devised, and great economic loss continued prior to the present invention. It was generally held by the scientific community that selenium was an alternative to vitamin E as a prophylactic and therapeutic agent in compating WMD, but selenium was considered to be hazardous and therefore not administered extensively.

It is an object of this invention to provide a composition and a process for the control of WMD which is highly dependable and effective, and which can be readily and precisely administered and is therefore safe by standard procedures.

Another object is to provide a composition of the character described which can be compounded at a reasonable cost, is stable, and retains its effectiveness over a prolonged period of time.

Now in accordance with the invention, WMD in mammals is controlled by the simultaneous administration of vitamin E and a selenium compound under conditions which avoid interference with utilization by the body by extraneous substances which may be present in the diet and inhibit utilization. The invention is based on the double discovery that (1) the simultaneous administration of these factors produces a synergistic effect and (2) that administration must be so effected as to avoid interference by such extraneous inhibiting substances.

More particularly, it was found that interference by such extraneous substances can be effected by parenteral, e.g., subcutaneous or intramuscular, injection of an injectable composition consisting essentially of vitamin E and a selenium compound. Such extraneous substances are often present in the feed of herbivorous animals, and examples are compounds that contain sulfur, phosphorus and nitrates. On the other hand, non-herbivores, i.e., carnivores and omnivores, do not usually include large amounts of such substances in their diet, and the two synergistically acting materials can be administered orally. In this case, however, the synergism is less than optimum, although a demonstrable and satisfactory clinical response is achieved. Further, it is in this case preferable to encapsulate the vitamin E and selenium compound, both for the purpose of controlling the dose administered and insuring the simultaneous entry of these factors into the body of the non-herbivore.

The present inventors postulated that the biochemical basis of the degenerative disease condition in WMD rests in part on the improper metabolism of lipids in the body as a result of an impairment or derangement of selenium and vitamin E activity. Both of these act primarily as anti-oxidants in alternative pathways of intermediate metabolism, preventing the formation of lipid peroxides and acting as free-radical traps in neutralizing these damaging peroxides. When selenium and vitamin E are not available in cellular metabolism in adequate amounts or proportions, the resulting lipid peroxides cause severe cellular damage to non-selective tissues. This cellular necrosis produces the degenerative changes ultimately leading to clinical manifestations of the disease. However, it was known that prior attempts to control WMD by treating the disease as a dietary deficiency gave only undependable and unpredictable results. For these reasons no effective remedy was known. Further, there appeared to be no merit in a mixture of materials for controlling WMD because, when both vitamin E and a selenium compound were included in the feed to chicken for the control of exudative diathesis, vitamin E administered together with the selenium compound yielded no better results than the selenium compound alone. (Nesheim and Scott, Journal of Nutrition, vol. 65, 1958, pp. 601–618.)

The inventors further hypothesized that oral administration of selenium and of vitamin E gave inconsistent and inconclusive results in herbivora because:

1. Inhibiting substances common to the diet of herbivora often interfere with the adsorption, transport and utilization of these factors. It is necessary to avoid the presence of such inhibiting substances.

2. In non-herbivorous mammals these inhibiting substances are considerably less and often occur in such small amounts as not to require the precaution noted in (1).

3. There exists a variation in the ability of animals to adsorb, transport and utilize selenium and/or vitamin E in their respective bodies.

4. Both of these factors must be present. It was hypothesized that selenium plays a necessary part in the transport of vitamin E across the cell membrane wall.

Regardless of the correctness of the above-stated theories, use of mixtures of vitamin E and a selenium compound unexpectedly led to dependable and eminently satisfactory results in the treatment and prevention of WMD in mammals. In the course of extensive tests, it was found that these factors act synergistically. One possible explanation is that an adequate supply of both factors at the cellular level is necessary to assure dependable efficiency in the utilization of these substances by the animal. However, the true cause of this synergism is not known.

Synergism is demonstrated by tests which demonstrated an enhancement of potency of selenium and vitamin E by two to six times when they are administered simultaneously and the foregoing precaution against inhibiting substances is taken. Specifically, clinical evaluations show that selenium and vitamin E, administered simultaneously, produce an effectiveness of over 99 percent, both therapeutically and as a preventative; this is in contrast to about 44 to 48 percent effectiveness for selenium alone and about 12 to 16 percent for vitamin E alone. These tests were performed on herds of lambs and calves produced by stock grazing within a basin of generally uniform conditions of climate and forage properties, known to contain sufficient vitamin E to meet the normal requirements of the animals.

The effectiveness of the mixture has been established by the highly successful results achieved in the administration of over five million injected doses, most of which were administered prophylactically. These resulted in complete control of WMD. Thus, when an animal shows the slightest symptoms of WMD and is treated, recovery results in better than 99 percent of the animals. The treatment has also been applied prophylactically, with almost complete elimination of WMD. In one area in northern California, comprising four counties, it was estimated by the Department of Agriculture officials of California that annual savings of from one-half to one million dollars have been effected by the livestock industry through application of the invention. Savings are now estimated by Oregon State University to be ten million dollars annually for the Pacific Northwest.

Experimental work with the preparation of the invention has been carried out by many doctors of veterinary medicine and other scientific investigators, including as representative of the group: Gordon Shultz, D.V.M., Department of Agriculture, State of California; B. D. Kuhl, D.V.M., of Baker, Oregon; C. C. Beck, D.V.M., Department of Surgery and Medicine, Michigan State University; Jack A. Tucker, D.V.M., of Mount Shasta, California; Don L. Mace, D.V.M., M.P.H., California State Department of Agriculture, Bureau of Animal Health; O. K. Kendall, D.V.M., of Yreka, California; Edward M. Smith, D.V.M., of Orland, California; R. M. Stauffer, D.V.M., of Red Bluff, California; H. M. Adams, D.V.M., of Astoria, Oregon; H. E. Hill, D.V.M., of imperial Beach, California; James M. Harris, D.V.M., of Oakland, California; Max W. Colton, D.V.M., of Santa Barbara, California; Harry A. Leonard, D.V.M., of Klamath Falls, Oregon; Jack L. Kohler, D.V.M., of Oakland, California; M. L. Miller, D.V.M., of Elma, Washington; A. L. Tappel, Ph. D., Professor, Department of Food and Science Technology, University of California; Fred J. Wedam, D.V.M., of Klamath Falls, Oregon; Joseph Riker, D.V.M., of Klamath Falls, Oregon; and George Crenshaw, D.V.M., of Orland, California. Findings in such experimental work have demonstrated the effectiveness of the present medication in the treatment and control of the group of metabolic degenerative diseases herein above discussed.

Various vitamin E and selenium compounds and derivatives have been evaluated and in each case the lowest common demoninator is the selenium atom or the tocopherol fraction we recognize as vitamin E. Therefore, selenium and vitamin E are the basic biochemically active factors responsible for the clinical effects observed and they each might be employed in various forms and compounds designed to introduce properly and effectively these basic factors, (selenium and vitamin E) into the body and thereby exert its pharmacodynamic effects upon metabolism. Examples of selenium compounds which may be used include sodium selenate, barium selenate, selenomethionine, di-seleno-di-valeric acid, sodium selenite, potassium selenite, barium selenite, seleno-cystene, selenium oxide, potassium seleno-cynate, etc.

Examples of vitamin E which may be used include alpha tocopherol, beta tocopherol, gamma tocopherol, delta tocopherol, epsilon tocopherol, zeta tocopherol, eta tocopherol, d-alpha tocopherol, d-l-alpha tocopherol, d-l-alpha tocopheryl acetate, mixed natural tocopherols, disodium salt of d-l-alpha tocopherol, alpha-tocopheryl succinate, and the tocopherol group individually and collectively.

It is, at present, preferred to use selenium in the form of sodium selenite, because of its solubility, relatively low toxicity, and bio-potency. Also, at present it is preferred to use vitamin E in the form of a member of the class consisting of d-alpha tocopheryl acetate or alpha tocopheryl succinate because of the absence of side effects, greater bio-potency and the ease with which they can be combined with the selenium compound to produce a safe and effective solution for injection or encapsulation. However, the biochemical action and effects as above discussed reside in the basic factors, selenium and vitamin E, and not in the vehicular compound of each employed to carry them into the body.

Several examples are presented of the preparation of the pharmaceutical composition of this invention. The first five are for parenteral injection and the sixth for oral ingestion. Generally, sodium selenite is included within a range of about 0.55 mg. to 11 mg. per cubic centimeter, and d-alpha tocopheryl acetate may be included in a range of about 10 to 100 mg. per cubic centimeter.

EXAMPLE I

Each c.c. contains:

| | |
|---|---|
| Selenium (as sodium selenite, 0.55 mgm. | 0.25 mg |
| Vitamin E (as d-alpha-tocopheryl acetate, 50 mgm) | 68 I.U.* |
| Polysorbate 80 U.S.P. | 250 mg |
| Thimerosal N.F. | 1 mg |
| Water q.s. to | 1 c.c. |

EXAMPLE II

Each c.c. contains:

| | |
|---|---|
| Selenium (as sodium selenite, 2.2. mg.) | 1.00 mg. |
| Vitamin E (as d-alpha-tocopheryl acetate, 50 mgm) | 68 I.U.* |
| Polysorbate 80 U.S.P. | 250 mg. |
| Thimerosal N.F. | 1 mg. |
| Water q.s. to | 1 c.c. |

EXAMPLE III

Each c.c. contains:

| | |
|---|---|
| Selenium (as sodium selenite, 11 mg) | 5.0 mg. |
| Vitamin E. (as d-alpha-tocopheryl acetate,) 50 mgm) | 68 I.U.* |
| Polysorbate 80 U.S.P. | 250 mg |
| Thimerosal N.F. | 1 mg |
| Water q.s. to | 1 c.c. |

EXAMPLE IV

Each c.c. contains:

| | |
|---|---|
| Selenium (as sodium selenite, 5.5 mg) | 2.5 mg. |
| Vitamin E (as d-alpha-tocopheryl acetate, 50 mg) | 68 I.U. |
| Polysorbate 80 U.S.P. | 10 mg. |
| Propylparaben | 1 mg. |
| Water for injection q.s. to | 1 c.c. |

EXAMPLE V

Each c.c. contains:

| | |
|---|---|
| Selenium (as sodium selenite, 2.2 mg) | 1.0 mg. |
| Vitamin E (as d-alpha-tocopheryl acetate, 50 mg) | 68 I.U.* |
| Polysorbate 80 U.S.P. | 10 mg. |
| Propylparaben | 1 mg. |
| Water for injection q.s. to | 1 c.c. |

EXAMPLE VI (for ingestion)
Each capsule to contain:

| | |
|---|---|
| Vitamin E (From d-alpha tocopheryl acid succinate containing 1210 I.U. per gm. — 59 mg. | 68 I.U.* |
| Selenium | 1 mg |

EXAMPLE VI-continued (for ingestion)
Each capsule to contain:

| | |
|---|---|
| (From sodium selenite — 2.3 mg.) | |
| Magnesium stearate (as filler and lubricant) | 25 mg |

*International Units

Sodium selenite ($Na_2SeO_3$) contains 45.67 percent selenium. It is a white crystalline powder. Its crystals are tetragonal prisms, stable in air. It is water soluble and is alkaline to litmus paper.

D-alpha tocopheryl acetate N.F. is a light brownish, nearly odorless, clear viscous oil having a melting point at approximately 25°C. It is insoluble in water and has a specific gravity of 0.950 to 0.964 inclusive.

Polysorbate 80 U.S.P. is a lemon to amber-colored oily liquid having a faint characteristic odor, and a warm somewhat bitter taste. It has a specific gravity of between 1.06 and 1.1. The pH of a 1 in 20 solution is between 6 and 8. Its principal use in the present composition is as a suspending or emulsifying agent for the d-alpha tocopheryl acetate. Its external phase is water. Polysorbate 80 is produced by Atlas Powder Co. under the trademark TWEEN.

Thimerosal N.F. is a light, cream-colored crystalline powder with slight characteristic odor. It is soluble in water and a 1 in 100 solution has a pH of 6.7. Thimerosal is produced by Mann Fine Chemical Co. of New York, N.Y. and by Eli Lilly Co. of Indianapolis, Indiana, under the trademark MERTHIOLATE. It functions in the present preparation as a bacteriostatic agent.

Propylparaben occurs as small, colorless crystals, or as a white crystalline powder. It has a melting point of about 95° – 98°C. One gram dissolves in 2000 mls. of water.

D-alpha tocopheryl acid succinate occurs as a white crystalline powder. It has little or no taste or odor. It is stable to air, but is unstable to alkali and to heat. The absorptivity of d-alpha tocopheryl acid succinate, determined in alcohol at 284 mu, is not less than 35 and not more than 40. One gm. of d-alpha tocopheryl acid succinate requires for neutralization not less than 18.0 ml and not more than 19.3 ml of 0.1N-NaOH, Melting Range between 73° and 78°C.

Magnesium stearate occurs as a fine white, bulky powder having a slight odor. It is insoluble in HOH, in alcohol and in ether.

The preparations, Examples I, II and III, may be compounded in the following manner. The D-alpha tocopheryl acetate and the Polysorbate 80 are preferably heated before admixing is attempted. A temperature of approximately 60°C. is satisfactory. The Polysorbate 80 is added to the d-alpha-tocopheryl acetate with constant agitation which is preferably quite vigorous. The sodium selenite and thimerosal are diluted in water solutions and preferably for this purpose about ½ of the required water, preferably freshly distilled, is heated to about 60°C. and the sodium selenite and thimerosal stirred into this water in quantity until solution is effected. The water solution is then added slowly to the first mentioned solution with constant agitation and the mixture is then brought to final volume with additional distilled water with agitation. The product is allowed to cool and then sterilized by suitable filtration through a Micro porcelain filter and vial aseptically. The product is opaque until it is cool.

Preparations, Examples IV and V, may be compounded in the following manner, the example here given being for 45000 mls batch:

Dissolve 45 gms of propylparaben in 250 gms of polysorbate with the aid of heat. Add 40 liters of water. Dissolve 247.59 gms of sodium selenite, adjust pH to 6.5 – 7.5 with HCl, and filter into calibrated bottle through a Millipore using an HA membrane. Heat to 60° in autoclave.

Using d-alpha tocopheryl acetate having 1360 U/mg, weigh out 2475 gms and add 245 gms of polysorbate into a beaker. Heat to 60°C. Add to the hot paraben-selenium-polysorbate solution. Stir well, cool, adjust to final volume, and check pH. Fill into vials with emulsion under constant vigorous agitation. Sterilize by autoclaving at 240°-250°F. for fifteen minutes Shake well about one hour after removing from autoclave pH tolerance: 5.5 – 7.5.

The preparation of Example VI is as follows:

Triturate the selenium into the vitamin E. Mix in the magnesium stearate very thoroughly and pass through a 14 mesh screen several times.

Run at 86.3 mg. per capsule (running tolerance: 80 to 93 mg.) on a Lilly capsulating machine, using No. 3 yellow-green hard shell capsules.

We have found the products produced as above to be completely stable. Stability tests performed three months after manufacture have indicated no deterioration.

The minimum recommended dose of selenium is about one-half milligram per 100 pounds of body weight, and the maximum dosage would be about ten milligrams per 100 pounds of body weight. The minimum recommended dosage for vitamin E would be about 25 International Units per 100 pounds of body weight and the maximum dose would be about 1500 International Units per 100 pounds of body weight.

The following Table is furnished as a guide for proper treatment of the animals noted:

| ANIMAL | PREPARATION EXAMPLE USED | RECOMMENDED DOSE |
|---|---|---|
| Newborn Lambs | I | 1 c.c. |
| Lambs — 2 weeks old | I | 4 c.c. |
| Lambs — 2 weeks old | II | 1 c.c. |
| Newborn calves | II | 2 c.c. |
| Pregnant Ewes | II | 2½ c.c. per 100 lbs.* |
| Weaner Calves | III | 1 c.c. per 200 lbs.* |
| Pregnant Cows | III | 1 c.c. per 200 lbs.* |
| Horses | IV | 1 c.c. per 100 lbs.* |
| Dogs | V | 1 c.c. per 20 lbs.* |
| Swine | II | 2½ c.c. per 100 lbs.* |
| Cats | V | 1 c.c. |
| Chickens | I | 1 c.c. |
| Turkeys | II | 1 c.c. |
| Antelope | II | 2½ c.c. per 100 lbs.* |
| Kangaroo | II | 2½ c.c. per 100 lbs.* |
| Dogs and Cats | VI | 1 capsule per 40 lbs. daily to weekly |
| Human | VI | 1 capsule per 40 lbs. daily to weekly |
| Swine | VI | 1 capsule per 40 lbs. daily to weekly |

*body weight

Best results have been obtained with lambs by injection of 1 c.c. at birth, followed at two weeks of age by 4 c.c. of Example I or 1 c.c. of Example II. The material is injected parenterally. In the case of the older lambs and ewes, the recommended therapeutic dose is a minimum of 1 c.c. of Example II subject to a maximum of 1½ c.c. per 100 pounds of body weight. This dosage may be repeated in seven to ten days and is to be injected parenterally.

Several case histories of the effectiveness of the present preparation in treating humans follow:

PATIENT: G. C. McConnell
ADDRESS: 18 Calvert Court Piedmont, California
SEX: Male
Age: 50
DATE: 2/14/64
WEIGHT: 230 lbs.
DOCTOR: Greenman
ADDRESS: Chester, California
HISTORY: Left shoulder injured trying to water ski. Could not lift over 5 pounds without pain. Could not raise arm without pain. July 19, 1959, was 3 days on Butazolidin - - - no response.
DIAGNOSIS: Bursitis (Chronic and persistent).
TREATMENT:
  Oct. 15, 1963, 2.5 mg. selenium and 68 I.U. d-alpha tocopheryl acetate
  Oct. 23, 1963, 5.0 mg. selenium and 136 I.U. d-alpha tocopheryl acetate
  Oct. 29, 1963, 5.0 mg. selenium and 136 I.U. d-alpha tocopheryl acetate
  Nov. 5, 1963, 5.0 mg. selenium and 136 I.U. d-alpha tocopheryl acetate
  Nov. 13, 1963, 2.5 mg. selenium and 68 I.U. d-alpha tocopheryl acetate
  Nov. 26, 1963, 5.0 mg. selenium and 136 I.U. d-alpha tocopheryl acetate
RESULTS: 5 days after initial dose partial relief was obtained followed by gradual and continuous improvement until complete absence of pain on all movements except laterally up to level of shoulder after 3 weekly doses. Lateral movement greatly improved but not asymptomic.

PATIENT: Dr. F. G. Rankin
ADDRESS: Salem, Oregon
SEX: Male
AGE: 50
DATE: 11/4/63
WEIGHT: 250 lbs.
DOCTOR: Same
ADDRESS: Salem, Oregon
HISTORY: Chronic and persistent rheumatic-arthritic neuralgia in sacro-iliac region gradually increasing in intensity over a 25 year period. Sleep interrupted by pain permitting only 1½ to 2 hours at a time. A sacro-iliac belt (14") has been worn for 7 years.
DIAGNOSIS: Chronic progressive rheumatic-arthritic neuralgia in spine (sacro-iliac).
TREATMENT: A combination S-T product (Burns) containing 2½ mg. selenium and 170 I.U. vitamin E per dose, 2 times weekly commencing August 25, 1963, to date.
RESULTS: 48 hours after initial dose, relief from pain allowed uninterrupted sleep for 4½ hours consecutively and could function for hours w/o sacro-iliac belt during waking period. Improvement gradual and steady to present so that uninterrupted sleep period is now 6 hours.

PATIENT: Mrs. Rankin
ADDRESS: 2360 Fairgrounds Road Salem, Oregon
SEX: Female

AGE: 50
DATE: 11/4/63
WEIGHT: 125 lbs.
DOCTOR: Dr. F. G. Rankin Salem, Oregon
HISTORY: Intermittent muscular spasms for over three years with extreme pain interfering with sleep and rest. Tranquilizers and narcotics analgesics offering some temporary relief.
DIAGNOSIS: Spastic Neuro-Myositis.
TREATMENT: Burns S-T product containing per dose: 2½ mg. selenium and 170 I.U. vitamin E per week to present (4 weeks).
RESULTS: Within 24 hours after initial dose, spasticity markedly reduced and at present after 4 weekly doses patient is asymptomatic; no pair, no spasm and no clinical evidence of original disorder.
PATIENT: Gwynne McKenzie
ADDRESS: 5823 Trask Oakland, California
SEX: Female
AGE: 60
DATE: 2/14/64
WEIGHT: 130 lbs.
DOCTOR: Clinic Doctors
ADDRESS: Kaiser Hospital
HISTORY: Very severe headaches — persistent and chronic migrating pain along spinal column from between shoulders, up neck to head. Treatment consisted of "Butazolidin", vitamins, Hormones and Cortico-steroids with control of pain initially and gradual diminishment in effectiveness.
DIAGNOSIS: Neuro-Muscular-Skeletal Degeneration.
TREATMENT: One Capsule, Example II above, every other day for 2 weeks commencing Nov. 7, 1963. Discontinued for 3 weeks. Resumed treatment with 1 Capsule every other day for two weeks, at end of this period dosage decreased to 1 Capsule per week. All other medication was discontinued at onset of treatment with Capsules, Example II.
RESULTS: Within one week of treatment with preparation of the present invention a slight and gradual reduction in pain and general discomfort. Within 10 days of initial dose complete relief from symptoms was achieved. 2 weeks after discontinuing Capsules a gradual return of pain occurred and Capsule treatment was resumed on 3rd week with prompt relief. One Capsule/week has been maintaining patient asymptomatic.

We claim:

1. A product useful in controlling white muscle disease syndrome in mammals, said product consisting essentially of a synergistic mixture of vitamin E and sodium selenite, the weight ratio of vitamin E to selenium being in the range 50:1 to 200:1, said mixture being in a pharmaceutically acceptable carrier in a medically effective amount and said product having a maximum selenium content of about 1.2% by weight.

2. A product according to claim 1 wherein said ratio is 50:1.

3. A product according to claim 1 wherein said ratio is 200:1.

4. A product according to claim 1 in the form of a capsule.

5. A product according to claim 1 in an injectable aqueous medium.

6. A product according to claim 5 containing about 10 to 100 milligrams of vitamin E per cubic centimeter and about 0.55 to 11 milligrams of sodium selenite per cubic centimeter.

7. A product according to claim 5 containing about 50 milligrams of vitamin E per cubic centimeter and about 0.55 to 2.2 milligrams of sodium selenite per cubic centimeter.

8. A product according to claim 5 containing about 50 milligrams of vitamin E per cubic centimeter and about 0.55 milligrams of sodium selenite per cubic centimeter.

9. A product according to claim 5 containing about 50 milligrams of vitamin E per cubic centimeter and about 2.2 milligrams of sodium selenite per cubic centimeter.

* * * * *